United States Patent [19]

Moore

[11] Patent Number: 5,763,682
[45] Date of Patent: Jun. 9, 1998

[54] HYDROPHILIC POLYOL AND PROCESS FOR PRODUCTION THEREOF

[75] Inventor: Terry L. Moore, Chattanooga, Tenn.

[73] Assignee: Woodbridge Foam Corporation, Canada

[21] Appl. No.: 576,695

[22] Filed: Dec. 21, 1995

[51] Int. Cl.$^6$ .................................................. C07C 41/00
[52] U.S. Cl. ....................... 568/672; 568/613; 521/905; 528/904
[58] Field of Search ............................ 521/905; 528/904; 568/672, 613

[56] References Cited

U.S. PATENT DOCUMENTS

| | | | |
|---|---|---|---|
| 3,149,000 | 9/1964 | Beicos et al. | 117/98 |
| 3,781,231 | 12/1973 | Janssen et al. | 260/2.5 |
| 3,873,476 | 3/1975 | Jabs et al. | 260/2.5 |

Primary Examiner—Gary Geist
Assistant Examiner—Sreeni Padmanabhan
Attorney, Agent, or Firm—Fitzpatrick, Cella, Harper & Scinto

[57] ABSTRACT

A hydrophilic polyol having a molecular weight of less than about 4500 and comprising ethylene oxide units and alkylene oxide units selected from propylene oxide, butylene oxide and mixtures thereof in a weight ratio of ethylene oxide units to alkylene oxide units in the range of from about 95:5 to about 60:40, the polyol having a secondary hydroxyl content of at least about 80% based on the total hydroxyl content of the polyol. A process for producing the hydrophilic polyol is also described. The process comprises the steps of: (i) contacting an initiator polyol with a first alkylene oxide stream comprising at least one member selected from the group consisting of ethylene oxide, propylene oxide, butylene oxide and mixtures thereof to produce a polyol reactant, the initiator polyol having a molecular weight of less than about 500 and consisting essentially of ethylene oxide and an initiator compound; and (ii) contacting the polyol reactant with a second alkylene oxide stream comprising at least one member selected from the group consisting propylene oxide, butylene oxide and mixtures thereof to produce the hydrophilic polyol. The amount of ethylene oxide and other alkylene oxide used in Steps (i) and (ii) is sufficient to provide a hydrophilic polyol having a weight ratio of ethylene oxide to other alkylene oxide of from about 95:5 to about 60:40 and a molecular weight of less than about 4500. The hydrophilic polyol may be used advantageously to produce a hydrophilic polyurethane foam, more particularly a hydrophilic superabsorbent polyurethane foam.

30 Claims, No Drawings

HYDROPHILIC POLYOL AND PROCESS FOR PRODUCTION THEREOF

BACKGROUND OF THE INVENTION

1. Field of the Invention

The present invention relates to a hydrophilic polyol and to a process for production thereof. More particularly, the present invention relates to a hydrophilic polyol useful in the production of a polyurethane foam, even more particularly a superabsorbent polyurethane foam.

2. Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that the chemistry can be used to achieve desired product properties in situ.

One of the conventional ways to produce a polyurethane foam is known as the "one-shot" technique. In this technique, the isocyanate, a suitable polyol, a catalyst, water (which acts as a primary blowing agent and can optionally be supplemented with one or more secondary organic blowing agents) and other additives are mixed together at once using, for example, a mechanical or impingement mixer. Generally, if one were to produce a polyurea, the polyol would be replaced with a suitable polyamine. A polyisocyanurate may result from cyclotrimerization of the isocyanate component. Urethane-modified polyureas or polyisocyanurates are known in the art. In either scenario, the reactants would be intimately mixed very quickly using a suitable mixer.

Another technique for producing foamed isocyanate-based polymers is known as the "prepolymer" technique. In this technique, a prepolymer of polyol and isocyanate (in the case of a polyurethane) are reacted in an inert atmosphere to form a liquid polymer terminated with isocyanate groups. To produce the foamed polymer, the prepolymer is thoroughly mixed with a polyol (in the case of producing a polyurethane) or a polyamine (in the case of producing a polyurea) in the presence of a catalyst or a cross-linker.

As is known by those of skill in the art, many conventional isocyanate-based foams are non-hydrophilic (i.e. relatively hydrophobic). Such foams generally have an aversion to aqueous fluids. Practically, this results in such foams being unable to absorb or pick up significant quantities of aqueous fluids (e.g. the foams will float on water) other than by mechanical entrainment. Accordingly, such foams are virtually never used in an application in which significant fluid absorption is a desired feature.

Heretofore, the prior art has endeavoured to produce hydrophilic isocyanate-based foams (i.e. foams which are able to absorb or pick up significant quantities of aqueous fluids) using two general approaches.

The first approach has been to confer hydrophilicity to an otherwise hydrophobic foam by use of specific active hydrogen-containing compound (e.g. polyol in the case of polyurethane) and/or another additive to the reaction system. For example, it is known that use of a polyol commercially available from Olin Corporation under the tradename POLY-G-X-609® in an otherwise conventional formulation will result in production of a hydrophilic polyurethane foam. See also, for other examples of this approach, U.S. Pat. Nos. 3,781,231 (Janssen et al.) and 3,799,898 (Lamplugh et al.), and British patent 1,354,576 (Fritz Nauer & Co.), the contents of each of which are hereby incorporated by reference. The resultant foam is hydrophilic in the sense that it will absorb or pick up an aqueous fluid (e.g. when the foam is immersed in a body of water, it will be at least partially or totally submerged). However, the resultant foam is incapable of retaining substantial quantities of any absorbed or picked up aqueous fluid (e.g. in the previous example, when the at least partially or totally submerged foam is removed from the body of water, the absorbed water will immediately begin to drain from the foam matrix). The result of this is that, previously known hydrophilic foams produced according to the first approach are unsuitable for use in applications where aqueous fluid absorption and retention are required (e.g. disposable diapers, disposable training pants, sanitary napkins, incontinence devices and other personal hygiene products, general purpose sponges, surgical sponges, absorbent devices for agricultural/horticultural applications, pest control, chemical spill blockage and the like).

The second approach has been to combine a non-hydrophilic (i.e. relatively hydrophobic) isocyanate-based foam with a superabsorbent material. Generally, a material is considered superabsorbent if it will absorb a multiple of its weight of a fluid. Thus, most known superabsorbent materials are capable of absorbing at least about ten times, preferably at least about twenty times, their in weight of an aqueous fluid. For examples of this approach, see U.S. Pat. Nos. 3,900,030, 4,394,930 (Korpman), 4,731,391 (Garvey) and 4,985,467 (Kelly et al.), and published Japanese patent applications 55/168,104 and 57/92,032, the contents of each of which are hereby incorporated by reference. A general disadvantage of this approach is that, as aqueous fluid absorption occurs initially via the surface of the foam, the superabsorbent material therein expands thereby retarding migration of the fluid to the interior of the foam with the result that the amount of aqueous fluid absorption or pick up is significantly limited. The principal reason for this phenomenon is that the foam matrix has a cellular structure which is one or both of closed (this inhibits fluid absorption) or open (this allows fluid absorption). As is known in the art, an open cellular structure is one wherein a cellular structure is maintained and is open by virtue of providing fissures or cracks in the windows between the cell struts. The fissures or cracks result in cells which are effectively interconnected as regards fluid absorption or pick up.

Many of these difficulties of the prior art are obviated or mitigated by the isocyanate-based foamed polymer disclosed in copending U.S. patent application Ser. No. 08/413,433, filed Mar. 30, 1995, the contents of which are hereby incorporated by reference. Specifically, the invention disclosed in the No. '433 application relates, inter alia, to a foamed isocyanate-based polymer having a cellular structure and containing a superabsorbent material, the polymer being capable of: (i) absorbing at least about 20 times its weight of an aqueous fluid maintained at a temperature of from about 20° to about 25° C. and (ii) retaining at least about 20 times its weight of absorbed aqueous fluid which is bound to the superabsorbent material. When producing polyurethane, it is preferred to utilize a hydrophilic polyol. A particularly preferred hydrophilic polyol is commercially available from The Dow Chemical Company under the tradename VORANOL® CP1421. While a polyurethane foam produced using this polyol absorbs and retains large amounts of water, it suffers from being overly soft which hampers fabrication and handling of the foam on a commercial scale.

A further problem which exists with conventional hydrophilic foams (superabsorbent or not) is that they possess very low wet tear strength.

In light of these difficulties in the prior art, it would be advantageous to have a hydrophilic polyol which could be used to reduce or overcome the softness problem of the foamed polymer disclosed in the No. '433 application. It would be further advantageous to have a hydrophilic polyol which could be used to reduce or overcome the problem of low wet tear strength in conventional hydrophilic foams. It would be even further advantageous if such a hydrophilic polyol was relatively uncomplicated to produce and could be produced in a conventional polyol production processing scheme.

SUMMARY OF THE INVENTION

It is an object of the present invention to provide a novel hydrophilic polyol which obviates or mitigates one or more of the above-identified deficiencies of the prior art.

It is another object of the present invention to provide a novel process for producing such a hydrophilic polyol.

Accordingly, in one of its aspects, the present invention provides a hydrophilic polyol having a molecular weight of less than about 4500 and comprising ethylene oxide units and alkylene oxide units selected from propylene oxide, butylene oxide and mixtures thereof in a weight ratio of ethylene oxide units to alkylene oxide units in the range of from about 95:5 to about 60:40, the polyol having a secondary hydroxyl content of at least about 80% based on the total hydroxyl content of the polyol.

In another of its aspects, the present invention provides a process for producing a hydrophilic polyol comprising the steps of:

(i) contacting an initiator polyol with a first alkylene oxide stream comprising at least one member selected from the group consisting of ethylene oxide, propylene oxide, butylene oxide and mixtures thereof to produce a polyol reactant, the initiator polyol having a molecular weight of less than about 500 and consisting essentially of poly(ethylene oxide) chains bonded to an initiator compound; and (ii) contacting the polyol reactant with a second alkylene oxide stream comprising at least one member selected from the group consisting propylene oxide, butylene oxide and mixtures thereof to produce the hydrophilic polyol;

wherein the amount of ethylene oxide and other alkylene oxide used in Steps (i) and (ii) is sufficient to provide a hydrophilic polyol having a weight ratio of ethylene oxide units to other alkylene oxide units of from about 95:5 to about 60:40 and a molecular weight of less than about 4500.

Thus, the present hydrophilic polyol is of sufficiently low molecular weight that it will eliminate or reduce the foam softening problem described hereinabove, while being sufficiently hydrophilic to confer hydrophilicity to the foam generally. This renders the present hydrophilic polyol particularly useful in the production of the isocyanate-based foam described in the No. '433 application incorporated be reference hereinabove. It is believed that the present hydrophilic polyol may be advantageously used to produce a hydrophilic polyurethane foam having improved wet tear strength.

DETAILED DESCRIPTION OF THE PREFERRED EMBODIMENTS

Thus, an aspect of the present invention relates to a process for the production of a hydrophilic polyol.

Step (i) in the process comprises contacting an initiator polyol with a first alkylene oxide stream comprising at least one member selected from the group consisting of ethylene oxide, propylene oxide, butylene oxide and mixtures thereof to produce polyol reactant, the initiator polyol having a molecular weight of less than about 500 and consisting essentially of poly(ethylene oxide) chains bonded to an initiator compound.

The initiator polyol is a low molecular weight polyol consisting essentially of short chains of poly(ethylene oxide) bonded to an initiator compound. The choice of initiator compound is not particularly restricted and is within the purview of a person skilled in the art. Preferably, the initiator compound is selected from the group consisting of hydroxyl compounds and amine compounds. Non-limiting examples of hydroxyl compounds may be selected from the group consisting of ethylene glycol, diethylene glycol, water, 1,2-propylene glycol, dipropylene glycol, glycerine, trimethylolpropane, pentaerythritol and mixtures thereof. Non-limiting examples of amine compounds may be selected from the group consisting of ethylene diamine, toluene diamine, 4,4'-diaminodiphenylmethane, diethylenetriamine, sorbitol, sucrose and mixtures thereof. The preferred initiator compound is glycerine. As is known in the art, the functionality of the initiator compound is equivalent to the number of active hydrogens contained in the initiator compound. Generally, useful polyols have a functionality of at least 2. Glycerine, the preferred initiator compound has a functionality of 3.

The production of the initiator polyol is within the purview of a person skilled in the art. Generally, the initiator polyol may be produced by reaction of the initiator compound with ethylene oxide in the presence of a catalyst. Conventionally, the catalyst is a base, preferably potassium hydroxide. Preferably, the initiator compound is slurried with an aqueous mixture of the catalyst (e.g. 50% KOH(aq)). Thereafter, the ethylene oxide may be introduced to the slurry and the reaction is allowed to proceed until substantially all of the ethylene oxide has reacted. The amount of initiator compound and ethylene oxide used in the reaction may be readily determined by targeting a molecular weight for the initiator polyol. The molecular weight of the initiator polyol is less than about 500, preferably less than about 300, more preferably in the range of from about 200 to about 300, most preferably in the range of from about 250 to about 300. Once the molecular weight of the initiator polyol is chosen, the relative amounts of initiator compound and catalyst required can be readily calculated. Preferably, the catalyst is 50% KOH(aq) and is used in an amount to provide about 3% KOH based on the overall slurry.

As will be apparent to those of skill in the art, during production of the initiator polyol, ethylene oxide units will be subjected to ring opening and are added to the initiator compound at the site of the active hydrogens —see Chapter 2 of "Flexible Polyurethane Foams" edited by R. Herrington and K. Hock (1991), the contents of which are hereby incorporated by reference. Thus, the initiator polyol comprises a number of short poly(ethylene oxide) chains bonded to the initiator compound. The number of short poly(ethylene oxide) chains in a given initiator polyol will be equivalent to the functionality of the initiator compound. Thus, in the case of glycerine, the preferred initiator compound, there will be 3 short chains of poly(ethylene oxide). The short chains may each comprise from 2 to 10 repeating units of ethylene oxide. The initiator polyol may generally be regarded as a diol, triol, tetraol, etc. depending on the functionality of the initiator compound (e.g. glycerine has a functionality of 3 and thus gives rise to an initiator compound which is a triol).

The initiator polyol is then contacted with a first alkylene oxide stream comprising at least one member selected from the group consisting of ethylene oxide, propylene oxide, butylene oxide and mixtures thereof to produce a polyol reactant. Generally, this is done in the presence of a catalyst of the type and in substantially the same amount used to produce the initiator compound. The purpose of this step is to grow the polymer chain of the initiator compound to produce a reactant polyol having a molecular weight just under the molecular weight of the hydrophilic polyol. As discussed hereinabove, the overall target molecular weight of the hydrophilic polyol is less than about 4500. Since the reactant polyol is to be further reacted with a second alkylene oxide stream, the molecular weight of the reactant polyol should be regulated to be sufficiently below the overall molecular weight of the hydrophilic polyol so that the reaction between the reactant polyol and the second alkylene oxide stream does not increase the molecular weight of the polyol beyond the target of less than about 4500. Practically, this will involve production of a reactant polyol having a molecular weight of from about 250 to about 400 less than the overall molecular weight target of the hydrophilic polyol.

Preferably, the first alkylene oxide stream consists solely of ethylene oxide. As will be apparent to those of skill in the art, this will result in production of a reactant polyol consisting of a number of poly(ethylene oxide) chains bonded to the initiator compound. The number of such chains will be equivalent to the functionality of the initiator compound. As will be apparent to those of skill in the art, such a reactant polyol will be terminated exclusively with primary hydroxyl groups.

Step (ii) in the present process comprises contacting the polyol reactant with a second alkylene oxide stream comprising at least one member selected from the group consisting propylene oxide, butylene oxide and mixtures thereof to produce the hydrophilic polyol. Essentially, the purpose of this Step in the process is to ensure that any terminal primary on the reactant polyol are capped with secondary hydroxyl groups. Generally, this is done in the presence of a catalyst of the type and in substantially the same amount used to produce the initiator compound. Preferably, the second alkylene oxide stream consists solely of propylene oxide. As will be appreciated by those of skill in the art, this results in a propylene oxide-capped hydrophilic polyol.

The product of Step (ii) is a reaction mixture comprising, inter alia, the present hydrophilic polyol and the catalyst (typically KOH). As is known in the art, it is conventional to subject the reaction mixture to finishing steps to remove the catalyst remaining and, thereafter, to strip off any water and/or volatile components. It is conventional to remove the catalyst since it can poison downstream polymerization and/or promote uncontrollable reactant polymerization. The manner by which the catalyst is removed is not restricted and is within the purview of a person skilled in the art. For example, the catalyst may be removed from the polyol using one or more of the following techniques: ion exchange resins, aqueous extraction and acid neutralization. Thereafter, the water and/or volatile components are stripped from the hydrophilic polyol at a suitable temperature and pressure (e.g. 140° C. @ 0.5 mmHg).

The amount of ethylene oxide and other alkylene oxide (the total amount of propylene oxide and/or butylene oxide) used in Steps (i) and (ii) is sufficient to provide a hydrophilic polyol having a weight ratio of ethylene oxide to other alkylene oxide of from about 95:5 to about 60:40, preferably from about 95:5 to about 70:30, more preferably from about 95:5 to about 80:20, most preferably from about 95:5 to about 90:10, and a molecular weight of less than about 4500, preferably a molecular weight in the range of from about 2000 to about 4500, more preferably from about 2800 to about 4300, most preferably from about 3000 to about 4100. Generally, it is known in the art to preselect the molecular weight of the polyol and thereafter calculate the amount alkylene oxide required to achieve the preselected molecular weight. See, for example, Chapter 6 of "Flexible Polyurethane Foams" edited by R. Herrington and K. Hock (1991), the contents of which are hereby incorporated by reference.

In the process described above, the polyol initiator is reacted in Step (i) with the first alkylene oxide stream. In most commercial operations, for the sake of process convenience, it is conventional to produce the polyol initiator independently of the process to produce the final polyol. Thus, it is conventional to have the polyol initiator in a holding tank and feed this as required into a reactor with catalyst and an alkylene oxide stream. In the context of the present method, it is preferred to produce the polyol initiator independently of the production of the hydrophilic polyol. Thus, it is preferred to initially produce the polyol initiator which is then recovered, isolated and placed in a holding tank. Thereafter, the polyol initiator is used in Step (i) of the present process to produce the polyol reactant which is used in Step (ii) of the present process to produce the hydrophilic polyol. Of course, those of skill in the art will appreciate that the present process is not limited to independent production of the polyol initiator. Thus, an alternate embodiment of the present process encompasses the initiator polyol in Step (i) being produced in situ without being isolated. In this alternate embodiment, it is contemplated that production of the initiator polyol and Step (i) (i.e. production of the polyol reactant) occur sequentially in the same reactor. In other words, the polyol reactant may be produced directly from the initiator compound without isolation of the initiator polyol.

In the present process, the manner by which the alkylene oxide chains are grown on the polyol is not particularly restricted. As described above, the most preferred protocol is to react ethylene oxide with the initiator compound to produce the initiator polyol which is preferably reacted solely with ethylene oxide to produce a reactant polyol (product of Step (ii)). However, it is also possible to produce the initiator polyol and/or the reactant polyol using another alkylene oxide such as propylene oxide, butylene oxide and mixtures thereof provided of course that the overall weight ratio ethylene oxide to other alkylene oxide is in the range of from about 95:5 to about 60:40. This can be done using a "hetero-feed" of the ethylene oxide and the other alkylene oxide(s). Alteratively, this can be done using "pseudoblock" or "true block" techniques, wherein each alkylene oxide is individually and selectively fed to the reaction mixture with ("true block") or without ("pseudo-block") sufficient digestion between the change from one alkylene oxide to another.

The product of the present process is a hydrophilic polyol having a molecular weight of less than about 4500 and comprising ethylene oxide units and alkylene oxide units selected from propylene oxide, butylene oxide and mixtures thereof in a weight ratio of ethylene oxide units to alkylene oxide units in the range of from about 95:5 to about 60:40, the polyol having a secondary hydroxyl content of at least about 80% based on the total hydroxyl content of the polyol.

Preferably, the molecular weight of the present hydrophilic polyol is in the range of from about 2000 to about 4500, more preferably from about 2800 to about 4300, most preferably from about 3000 to about 4100. Molecular weight can be readily determined by those of skill in the art—see, for example, Chapter 6 of "Flexible Polyurethane Foams" edited by R. Herrington and K. Hock (1991), the contents of which are hereby incorporated by reference.

Preferably, the weight ratio of ethylene oxide units to alkylene oxide units is in the range of from about 95:5 to about 70:30, more preferably from about 95:5 to about 80:20, most preferably from about 95:5 to about 90:10. As discussed above with respect to the present process, the weight ratio of ethylene oxide to alkylene oxide can be determined by knowing the amount of ethylene oxide and alkylene oxide used in the process to achieve a preselected molecular weight, in this case less than about 4500. Alternatively, it is possible to use comparative infrared spectrum analysis and/or NMR spectroscopy to determine the weight ratio.

The preferred alkylene oxide (i.e. other than ethylene oxide) in the present hydrophilic polyol consists solely of propylene oxide.

Preferably, the secondary hydroxyl content of present hydrophilic polyol is at least about 85%, more preferably at least about 90%, most preferably at least about 95%, based on the total hydroxyl content of the polyol. The determination of secondary hydroxyl content is within the purview of a person skilled in the art. See, for example, Chapter 6 of "Flexible Polyurethane Foams" edited by R. Herrington and K. Hock (1991), the contents of which are hereby incorporated by reference. Generally, the secondary hydroxyl content can be distinguished from primary hydroxyl content using NMR spectroscopy.

The present hydrophilic polyol is useful in the production of hydrophilic foams, particularly hydrophilic polyurethane foams. It is believed that a hydrophilic polyurethane foam produced using the present hydrophilic polyol will possess enhanced wet tear strength. A particularly preferred use of the present hydrophilic polyol is in the production of the isocyanate-based foamed polymer disclosed in the incorporated, copending No. '433 application discussed above. It is believed that the softness problem associated with commercial production of the isocyanate-based foamed polymer disclosed in the No. '433 application can be reduced or eliminated by using the present hydrophilic polyol. In other words, it is believed that the present hydrophilic polyol can be used to confer load bearing properties to a hydrophilic polyurethane foam. A further advantage of the present hydrophilic polyol is that it is contemplated that it can be the sole polyol used to produce the isocyanate-based foamed polymer disclosed in the No. '433 application. This would obviate the use a mixture of hydrophobic polyol and hydrophilic polyol to produce the isocyanate-based foamed polymer disclosed in the No. '433 application, thereby simplifying reactant metering and process control.

An embodiment of the present invention will be described with reference to the following Example which is not intended to limit the scope of the invention.

EXAMPLE

In this Example, a hydrophilic polyol is produced in accordance with the present method. The hydrophilic polyol has a molecular weight of approximately 3800.

To produce such a polyol, 92 g (1 mole) of glycerine is slurried with a sufficient amount of 50% KOH(aq) to result in a concentration of 3% KOH based on the overall slurry. 176 g (4 moles) of ethylene oxide is added to the slurry and the mixture is allowed to react to produce an initiator polyol having a molecular weight of 268. The initiator polyol so produced is then stripped at 120° C. in a vacuum of less than 1 mmHg for a period of time sufficient to remove substantially all water, unreacted chemicals and volatiles.

The stripped initiator polyol is introduced into a pressurized reactor and is slurried with a sufficient amount of 50% KOH(aq) to result in a concentration of 3% KOH based on the overall slurry. Thereafter, 3232 g (73.46 moles) of ethylene oxide is gradually introduced to the pressurized reactor mixture and the heat of reaction is removed (the reaction is exothermic) as efficiently as possible. In this regard, care is exercised to avoid adding too ethylene oxide at once due to the exothermicity of the reaction. The resulting reaction mixture is digested at temperature of 120° C. (by appropriate removal of heat) for a period of time (e.g. 30 minutes) sufficient ensure substantially complete reaction of the stripped initiator and the ethylene oxide to produce a reactant polyol having a molecular weight of 3500.

After digestion of the reaction mixture, 348 g (6 moles) of propylene oxide is added to the reactor to cap the terminal ends of the reactant polyol thereby maximizing the secondary hydroxyl content of the hydrophilic polyol.

The hydrophilic polyol is recovered by flashing off residuals (e.g. water, organics, etc.).

The product hydrophilic polyol has a molecular weight of approximately 3800 (the theoretical molecular weight is 3848 (i.e. assuming all reactions are 100% stoichiometric and that 100% of product from each reaction is recovered)). As will be apparent to those of skill in the art, the total weight ethylene oxide and propylene oxide used to produce the hydrophilic polyol was 3408 g and 348 g, respectively, to provide an ethylene oxide:propylene oxide weight ratio of 90.7:9.3.

While the present invention has been described with reference to various specific embodiments and the above Example, modifications of and variations to the various specific embodiments and the above Example will be readily apparent to those of skill in the art without departing from the spirit and scope of the present invention. It will of course be understood that such modifications and variations are intended to be with the scope of the present invention.

What is claimed is:

1. A hydrophilic polyol having a molecular weight of less than about 4500 and comprising a polymer chain consisting essentially of ethylene oxide units and alkylene oxide units selected from propylene oxide, butylene oxide and mixtures thereof in a weight ratio of ethylene oxide units to alkylene oxide units in the range of from about 95:5 to about 60:40, the polymer chain being terminally capped with said alkylene oxide unit, the polyol having a secondary hydroxyl content of at least about 80% based on the total hydroxyl content of the polyol.

2. The hydrophilic polyol defined in claim 1, wherein the molecular weight is in the range of from about 2000 to about 4500.

3. The hydrophilic polyol defined in claim 1, wherein the molecular weight is in the range of from about 2800 to about 4300.

4. The hydrophilic polyol defined in claim 1, wherein the molecular weight is in the range of from about 3000 to about 4100.

5. The hydrophilic polyol defined in claim 1, wherein the alkylene oxide units consist of propylene oxide.

6. The hydrophilic polyol defined in claim 5, wherein the weight ratio of ethylene oxide units to propylene oxide units is from about 95:5 to about 70:30.

7. The hydrophilic polyol defined in claim 5, wherein the weight ratio of ethylene oxide units to propylene oxide units is from about 95:5 to about 80:20.

8. The hydrophilic polyol defined in claim 5, wherein the weight ratio of ethylene oxide units to propylene oxide units is from about 95:5 to about 90:10.

9. The hydrophilic polyol defined in claim 1, wherein the secondary hydroxyl content is at least about 85% based on the total hydroxyl content of the polyol.

10. The hydrophilic polyol defined in claim 1, wherein the secondary hydroxyl content is at least about 90% based on the total hydroxyl content of the polyol.

11. The hydrophilic polyol defined in claim 1, wherein the secondary hydroxyl content is at least about 98% based on the total hydroxyl content of the polyol.

12. A process for producing a hydrophilic polyol comprising the steps of:
  (i) contacting an initiator polyol with a first alkylene oxide stream comprising at least one member selected from the group consisting of ethylene oxide, propylene oxide, butylene oxide and mixtures thereof to produce a polyol reactant consisting essentially of a polymer chain, the initiator polyol having a molecular weight of less than about 500 and consisting essentially of poly (ethylene oxide) chains bonded to an initiator compound; and
  (ii) contacting the polyol reactant with a second alkylene oxide stream comprising at least one member selected from the group consisting of propylene oxide, butylene oxide and mixtures thereof to terminally cap the polymer chain with propylene oxide, butylene oxide and mixtures thereof to produce thereby the hydrophilic polyol;
  wherein the amount of ethylene oxide and other alkylene oxide used in Steps (i) and (ii) is sufficient to provide a hydrophilic polyol having a weight ratio of ethylene oxide to other alkylene oxide of from about 95:5 to about 60:40 and a molecular weight of less than about 4500.

13. The process defined in claim 12, wherein the first alkylene oxide stream consists of ethylene oxide.

14. The process defined in claim 12, wherein the first alkylene oxide stream consists of a mixture of ethylene oxide and propylene oxide.

15. The process defined in claim 12, wherein the second alkylene oxide stream consists of propylene oxide.

16. The process defined in claim 12, wherein the first alkylene oxide stream consists of a mixture of ethylene oxide and propylene oxide, and the second alkylene oxide stream consists of propylene oxide.

17. The process defined in claim 12, wherein the initiator polyol is produced by reacting the initiator compound with ethylene oxide in the presence of a catalyst.

18. The process defined in claim 12, wherein the initiator compound is selected from the group consisting of ethylene glycol, diethylene glycol, water, glycerine, 1,2-propylene glycol, dipropylene glycol, glycerine, trimethylolpropane, ethylene diamine, pentaerythritol and mixtures thereof.

19. The process defined in claim 12, wherein the initiator compound is glycerine.

20. The process defined in claim 12, wherein the catalyst is potassium hydroxide.

21. The process defined in claim 12, wherein the initiator polyol has a molecular weight of less than about 300.

22. The process defined in claim 12, wherein the initiator polyol has a molecular weight in the range of from about 200 to about 300.

23. The process defined in claim 12, wherein the initiator polyol has a molecular weight in the range of from about 250 to about 300.

24. The process defined in claim 12, wherein amount of ethylene oxide and alkylene oxide used in Steps (i) and (ii) is sufficient to provide a weight ratio of ethylene oxide to alkylene oxide in the range of from about 95:5 to about 70:30.

25. The process defined in claim 12, wherein amount of ethylene oxide and alkylene oxide used in Steps (i) and (ii) is sufficient to provide a weight ratio of ethylene oxide to alkylene oxide in the range of from about 95:5 to about 80:20.

26. The process defined in claim 12, wherein amount of ethylene oxide and alkylene oxide used in Steps (i) and (ii) is sufficient to provide a weight ratio of ethylene oxide to alkylene oxide in the range of from about 95:5 to about 90:10.

27. The process defined in claim 12, wherein amount of ethylene oxide and alkylene oxide used in Steps (i) and (ii) is sufficient to provide hydrophilic polyol having a molecular weight in the range of from about 2000 to about 4500.

28. The process defined in claim 12, wherein amount of ethylene oxide and alkylene oxide used in Steps (i) and (ii) is sufficient to provide hydrophilic polyol having a molecular weight is the range of from about 2800 to about 4300.

29. The process defined in claim 12, wherein amount of ethylene oxide and alkylene oxide used in Steps (i) and (ii) is sufficient to provide hydrophilic polyol having a molecular weight in the range of from about 3000 to about 4100.

30. The process defined in claim 12, wherein the reactant polyol is produced directly from the initiator compound and the initiator compound is not isolated.

* * * * *